(12) United States Patent
Kirmse et al.

(10) Patent No.: US 8,663,011 B2
(45) Date of Patent: Mar. 4, 2014

(54) GAME SERVER FOR USE IN CONNECTION WITH A MESSENGER SERVER

(75) Inventors: Chris Kirmse, Sunnyvale, CA (US);
Brian Gottlieb, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 425 days.

(21) Appl. No.: 11/933,058

(22) Filed: Oct. 31, 2007

(65) Prior Publication Data
US 2008/0171601 A1 Jul. 17, 2008

Related U.S. Application Data

(63) Continuation of application No. 10/665,932, filed on Sep. 18, 2003, now abandoned, which is a continuation of application No. 09/898,746, filed on Jul. 2, 2001, now Pat. No. 6,699,125.

(60) Provisional application No. 60/215,710, filed on Jul. 3, 2000.

(51) Int. Cl.
*A63F 9/00* (2006.01)

(52) U.S. Cl.
USPC .............................................................. 463/42

(58) Field of Classification Search
USPC ................................................. 463/29, 40–42
See application file for complete search history.

(56) References Cited

U.S. PATENT DOCUMENTS

| | | | | |
|---|---|---|---|---|
| 1,072,003 A | * | 9/1913 | Hanson et al. | 83/356.2 |
| 4,631,042 A | * | 12/1986 | Rattunde | 474/8 |
| 5,667,440 A | * | 9/1997 | Sasaki et al. | 463/29 |
| 5,774,673 A | * | 6/1998 | Beuk et al. | 709/236 |
| 5,816,918 A | * | 10/1998 | Kelly et al. | 463/16 |
| 6,028,866 A | * | 2/2000 | Engel et al. | 370/461 |
| 6,179,713 B1 | | 1/2001 | James et al. | |
| 6,264,562 B1 | * | 7/2001 | McSheffrey et al. | 463/42 |
| 6,466,969 B1 | | 10/2002 | Bunney et al. | |
| 6,480,885 B1 | * | 11/2002 | Olivier | 709/207 |
| 6,496,854 B1 | | 12/2002 | Hagersten et al. | |
| 6,530,840 B1 | | 3/2003 | Cuomo et al. | |
| 6,699,125 B2 | | 3/2004 | Kirmse et al. | |
| 6,807,562 B1 | * | 10/2004 | Pennock et al. | 709/204 |

(Continued)

OTHER PUBLICATIONS battle.net. Jun. 20, 2000. <http://web.archive.org/web/20000620141009/http://www.battle.net/>.*

(Continued)

*Primary Examiner* — Seng H Lim
(74) *Attorney, Agent, or Firm* — James J. DeCarlo; Greenberg Traurig, LLP

(57) ABSTRACT

A game and messenger client-server system is provided that includes a plurality of game clients, a game server, a plurality of messenger clients, and a messenger server. The game server includes logic to operate a multiplayer game using inputs from and outputs to an active game set of game clients, wherein game clients other than those in the active game set can join an active game by supplying the game server with a reference to the active game. Additionally, logic is included for coupling a game client to a messenger client to allow the game client to send the messenger client data used to initiate joining a game, whereby a message sent by the messenger client includes the data used to initiate joining a game. Also, logic is included for initiating a join of a game at an invitee client, using data received in a message to the invitee.

20 Claims, 13 Drawing Sheets

(56) References Cited

U.S. PATENT DOCUMENTS

| | | | |
|---|---|---|---|
| 7,240,093 | B1 | 7/2007 | Danieli et al. |
| 7,401,150 | B2* | 7/2008 | Shea et al. .................... 709/229 |
| 2001/0016519 | A1* | 8/2001 | Choe ............................. 463/42 |
| 2002/0059379 | A1* | 5/2002 | Harvey et al. ................. 709/205 |
| 2002/0061778 | A1* | 5/2002 | Acres ............................. 463/40 |
| 2002/0061779 | A1* | 5/2002 | Maehiro ......................... 463/42 |
| 2002/0065097 | A1 | 5/2002 | Brockenbrough et al. |
| 2002/0087645 | A1* | 7/2002 | Ertugrul et al. ............... 709/206 |
| 2002/0090996 | A1* | 7/2002 | Maehiro ......................... 463/42 |
| 2002/0094870 | A1* | 7/2002 | Murray ........................... 463/42 |
| 2002/0119821 | A1* | 8/2002 | Sen et al. ....................... 463/42 |
| 2002/0140625 | A1* | 10/2002 | Kidney et al. ................. 345/1.1 |
| 2002/0174248 | A1* | 11/2002 | Morriss .......................... 709/238 |
| 2003/0125112 | A1 | 7/2003 | Silvester |
| 2004/0198403 | A1 | 10/2004 | Pedersen et al. |
| 2005/0027382 | A1 | 2/2005 | Kirmse et al. |
| 2005/0193134 | A1* | 9/2005 | Syrjala .......................... 709/230 |
| 2005/0209002 | A1* | 9/2005 | Blythe et al. .................... 463/42 |
| 2006/0287106 | A1 | 12/2006 | Jensen |
| 2007/0055728 | A1* | 3/2007 | Shea et al. .................... 709/204 |

OTHER PUBLICATIONS

Elektro, D., "NetPro: Enternet Global Network," GamePro, May 1999, p. 34.

Enternet Global Network, EGN/BrainScan, 1999.

Official Communication for U.S. Appl. No. 09/898,746 mailed Jun. 3, 2003.

Official Communication for U.S. Appl. No. 09/898,746 mailed Oct. 17, 2003.

Official Communication for U.S. Appl. No. 10/665,932 mailed Feb. 5, 2008.

Official Communication for U.S. Appl. No. 10/665,932 mailed Aug. 15, 2008.

Official Communication for U.S. Appl. No. 10/665,932 mailed Nov. 12, 2008.

Official Communication for U.S. Appl. No. 10/665,932 mailed Jun. 8, 2009.

Official Communication for U.S. Appl. No. 10/665,932 mailed Aug. 14, 2009.

Official Communication for U.S. Appl. No. 10/665,932 mailed Nov. 5, 2009.

Official Communication for U.S. Appl. No. 10/665,932 mailed May 26, 2010.

Official Communication for U.S. Appl. No. 10/665,932 mailed Aug. 6, 2010.

Dan Elektro, "NetPro: Enternet Global Nework," GamePro, p. 34, May 1999.

Enternet Global Network (EGN/BrainScan 1999).

* cited by examiner

Invocation Message

| |
|---|
| Message Header |
| Game ID = "Chase and Race 2000" |
| Game # = 176 |
| Commandline = "+Connect IP: 192.168.0.17:28001" |
| ServerDesc = "The Game Server" |
| Registry Entry = ".../software/ChaseandRace/location" |
| Faltback URL = ".../nogameinstalled.html" |
| Version = 1 |
| State = 1 |
| . . . |

GAME SERVER FOR USE IN CONNECTION WITH A MESSENGER SERVER

RELATED APPLICATIONS

This utility patent application is a Continuation of U.S. patent application Ser. No. 10/665,932, filed on Sep. 18, 2003, now pending, which is a Continuation of U.S. patent application Ser. No. 09/898,746, now issued as U.S. Pat. No. 6,699,125, which is based upon previously-filed U.S. Provisional Application No. 60/215,710, filed Jul. 3, 2000, the benefits of which are claimed under 35 U.S.C. §120 and U.S.C. §119(e), and are further incorporated herein by reference.

FIELD OF THE INVENTION

The present invention relates to the use of a game server in connection with a messenger server in a multi-user networked computing environment.

BACKGROUND OF THE INVENTION

With the advent of the global inter-network of networks generally referred to as "the Internet," communication between users connected to the Internet has been facilitated by programs such as email and instant messaging. Instant messaging allows users connected to the Internet to communicate between each other in real-time. Typically, a first user downloads an instant message program into their Internet connectable computing device that can invoke a window that includes a section for typing messages and for showing a list of other online users designated as "buddies" or as "friends" by the first user. Users can chat with any number of online buddies by selecting the desired users from their buddy list. A connection is then made between the user and selected buddy. Once the connection is completed, the users can communicate by typing and sending messages. Unlike email, the instant messages are designed to appear on the other user's instant message window as soon as they are sent and while the recipient is online. Thus, an interactive chat can be held using the instant message system.

Additionally, interactive games can be played through the Internet. For example, a card game, such as hearts, can be played between users. A user who desires to play in an interactive game can log on to a web site to join a game. At the web site, the user could decide to join a game with random players or can join a game with friends if the user has a reference to the game the friends are playing. However, to join a friend's game, the user must have reference to the specific game on the web site, such as a directory or uniform resource locator ("URL"). The user might have received the reference to the friends' game through email, or any other communications means, or alternatively, the user could have searched the site for games the user's friends were playing. Once locating the game, the web site typically facilitates joining the user to the game by providing a link or URL for the user to select to join the game. Once joining the game, the players of the game would then all view the same game and interact with the game through their respective browsers or user interfaces. As each player interacts with the game, the results of the interactions appear on all players' screens that are participating in the game. For example, if a player discards a card in the hearts game, all players would see the card discarded. Thus, users in remote locations can play an interactive game of hearts.

Using an instant messenger program, buddies can facilitate joining an interactive game between themselves. A text message can be sent to another online user through the instant messaging system asking the user if they want to play the desired game. Once receiving the message, the user can decide to join the game with the requester. However, to join the game, the user must have downloaded the game beforehand. Thus, if the game that the requester wants to play has not been downloaded, the user would have to find out where the game is located and download the game before proceeding. Once downloaded, the user launches the game in the user's computer. The game then finds connection information for the game from the user's instant messenger program and connects to the game. In conventional instant messaging configurations, the only communication sent between the requester and user is a text message asking the user to play a game. No other information regarding the game is sent to the user. Thus, the user must affirmatively find the game requested or download the game and connect to the game the requester is playing.

Additionally, the only users that can participate in the game are the users that were invited by the user who sent the original invitation. The invitation is sent out to the invited users and a game is launched with only the invited users as possible players. If there are other buddies who want to participate, the buddies must be affirmatively invited by a player of the game. Also, the players of the game are transparent to other buddies on the players' buddies lists. In other words, other buddies do not know the players are participating in an interactive game. Rather, the buddies only know that the players are currently on-line.

BRIEF SUMMARY OF THE INVENTION

The present invention relates to a game and messenger client-server system. In one embodiment of the present invention, end users connect game clients to a game server to allow multiple users to interact in a game. End users can use messenger clients to notify other end users that the notifier is currently in an online game and provide instructions for others to join a multiplayer game. In some embodiments, the messages sent to messenger clients of invitees contain sufficient data to allow an invitee to join a specific game that the inviter is playing.

In one embodiment of the present invention, a client-server system includes a plurality of game clients, a game server, a plurality of messenger clients, and a messenger server. The game server includes logic to operate a multiplayer game using inputs from and outputs to an active game set of game clients of the plurality of game clients, wherein game clients other than those in the active game set can join an active game by supplying the game server with a reference to the active game. The messenger server includes logic to forward messages from a sender messenger client to a receiving messenger client. Additionally, logic is included for coupling a game client to a messenger client to allow the game client to send the messenger client data used to initiate joining a game, whereby a message sent by the messenger client includes the data used to initiate joining a game. Also, logic is included for initiating a join of a game at an invitee client, using data received in a message to the invitee.

In another embodiment, a method of operating a multiplayer game having a plurality of game clients and a plurality of messenger clients in communication with a game server and a messenger server is provided. The method includes the steps of joining the game by sending a reference to the game to the game server; sending, from an inviter game client to an inviter messenger client, data used to initiate joining the game; sending a message including the data used to initiate joining the game to the messenger server; routing the message to an invitee messenger client; and using the data in the routed message to invoke a game client and join the game.

In one embodiment, the present invention provides for a software development kit (SDK) including novel software and processes. An exemplary game according to the present invention supports a SDK in connection with a local messenger client when the game connects to or disconnects from a game server, where such connects and disconnects use a small piece of code to effectuate multi-player gaming. When connecting to a game server, the game creates a command line that another player could use to launch his/her copy of the game and connect to the same game server. This command line (along with a short game name and description of the particular server) is sent from the messenger client to everyone in a player's friend list. The buddies' messenger clients download some additional game information and then shows an icon for the game next to the game player's name. When a friend selects "Join game," the messenger attempts to launch the game executable with the command line to join the same game server. If the users agree, the friends can remotely play a game together according to the present invention.

A further understanding of the nature and advantages of the invention herein may be realized by reference of the remaining portions in the specifications and the attached drawings.

BRIEF DESCRIPTION OF THE DRAWINGS

FIG. 5 is an illustration of an invocation message sent from an inviter game client to an inviter messenger client;

DETAILED DESCRIPTION OF SPECIFIC EMBODIMENTS OF THE INVENTION

In one embodiment of a game-messenger system that is described below, each of a plurality of end users operates a game client and a messenger client. The game clients interface with a central game server and the messenger clients interface with a central messenger server. Notwithstanding that description, it should be understood that the game client and messenger client can be merged into a single program or plug-ins to a single program, the central game server and the central messenger server can be operated as a unified server, and the central game server and/or the central messenger server can be replaced with a distributed server, all without necessarily departing from the scope of the invention. It should also be understood that the present invention is not limited to games, but that where a multiplayer game (i.e., a game configured to allow two or more players) is used as an example herein, another non-game multi-user application could be used instead. For example, instead of notifying other players of multiplayer game play, an inviter could invite other computer or computing device users to join in some other multi-user activity.

In this description, the terms "inviter" and "invitee" are used to distinguish end users between those that are playing a game and notifying others and those that are notified and given a notice of the playing. Often, the "inviter" will not so much be making an invitation to invitees to join a game but would be simply notifying buddies of the inviter that the inviter is playing an online game. Thus, instead of "inviter," "invitee" and "invitation," the terms "notifier," "notifyee" and "notification," respectively, might be used instead. On the other hand, in some embodiments, an inviter is actively inviting invitees. One implementation of such an embodiment might include a list of invitees maintained for the inviter that is used to limit the notification to only those users that the inviter specifically invites.

Figure 1:
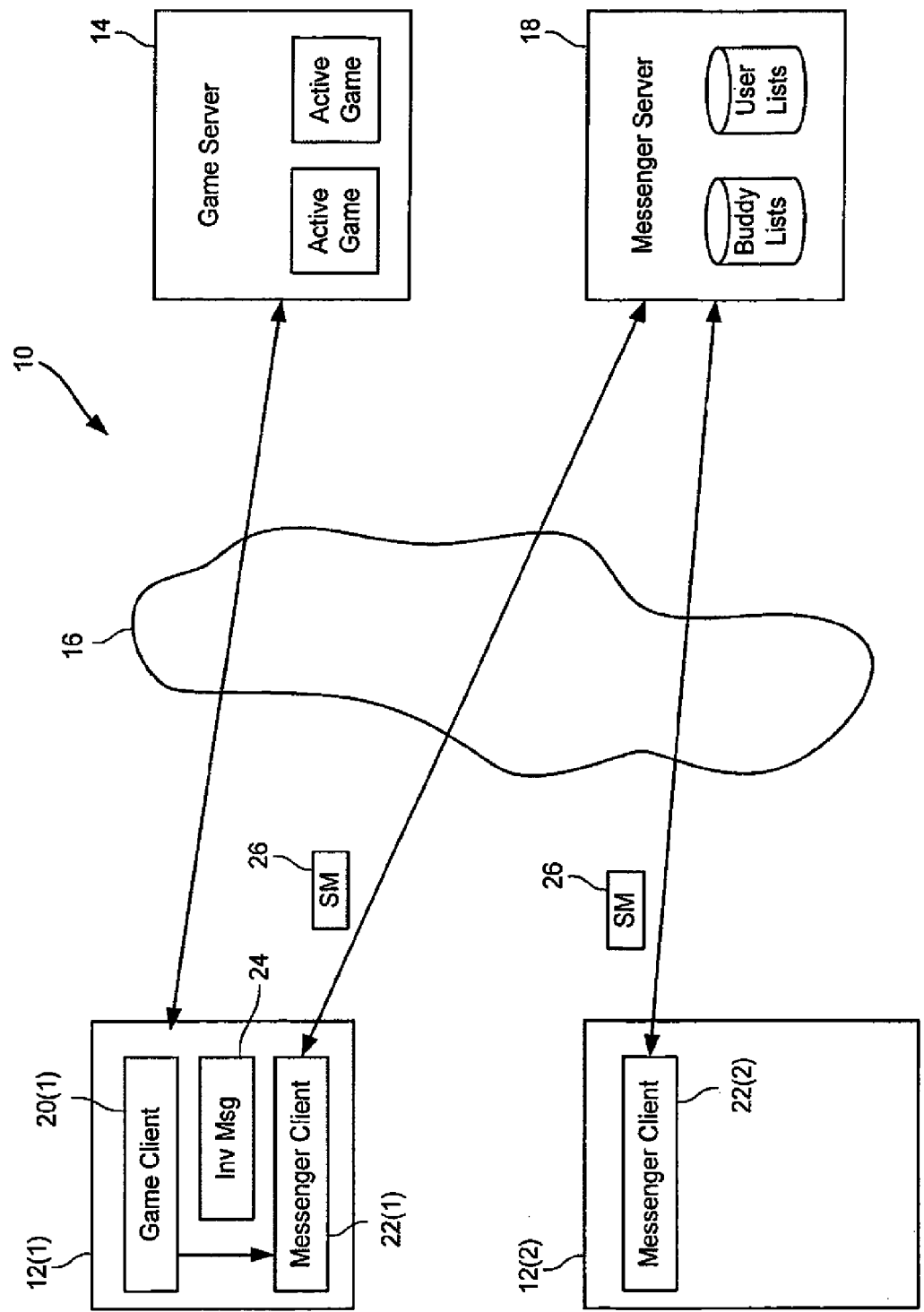
FIG. 1 is a block diagram of a game-messenger client-server system according to one embodiment of the present invention.

FIG. 1 is a block diagram of an exemplary game-messenger client-server system 10 according to one embodiment of the present invention. In system 10, users connect for online game play by connecting user computers 12 to a game server 14 via a network 16. In a specific implementation, user computers 12 are Internet-connectable computers (desktop computers, laptop computers, palm-sized computers, wearable computers, set-top boxes, embedded TCP/IP clients, wireless phones with a user interface, and the like), game server 14 is an Internet-connected server responsive to requests at a URL designated by the operator of the game server and network 16 is the global inter-network of networks generally referred to as the "Internet". The typical computer 12 includes a browser or other HTTP (Hyper Text Transport Protocol) client that is used to provide a user with HTTP access to the Internet and the collection of documents served by HTTP servers that is generally referred to as the "World Wide Web", "WWW", or simply "the Web". A messenger server 18 is also provided, often over network 16, so that one or more user can send messages (typically "instant messages") over network 16 to other users.

An exemplary computer 12 includes a display and display screen (e.g., monitor, flat panel LCD, etc.) for presenting to a user a graphical user interface (GUI). Computer 12 comprises standard computer components (not shown) such as a disk drive, CDROM drive, display adapter, network card, random access memory (RAM), central processing unit (CPU), and other components, subsystems and devices. User input devices such as mouse having buttons, keyboard, trackball, touch-screen, digitizing tablet, etc. may be used to by a user to enter information into computer 12.

Computer 12 includes also subsystems that are typically be found in a computing device such as computer 12. Subsystems generally include an input/output (I/O) controller, a system memory (or random access memory "RAM"), a central processing unit (CPU), a display adapter, a communications port, a fixed hard drive disk, a network interface adapter, which in turn is coupled electrically to a network, and any other like subsystems. The use of a bus allows each of the subsystems to transfer data among subsystems and, most importantly, with the CPU, where the CPU might be a Sparc, an Intel CPU, a PowerPC, or the like. External devices can communicate with the CPU or other subsystems via the bus by interfacing with a subsystem on the bus. Thus, a monitor connects with the display adapter and relative pointing device (e.g., a mouse) connects through one of the communication ports. Some devices such as keyboard can communicate with the CPU by direct means without using the main data bus as, for example, via an interrupt controller and associated registers. Accord to some embodiments described herein, a game client and a messenger client operate to present a user with graphical information on a user interface for playing a game as well as notifying other friends of one's action of playing a game.

The network provides the communication means, such as physical interconnective links comprising copper wire, fiber optic cable, or the like, for transmitting and receiving signals. Wireless communication means, such as radio waves or the like, are also understood to provide means to transfer information from a source to a destination.

As is well known in the art of network communications, networks are configured to communicate electrical information, such as a computer data signal comprising data (e.g., binary data bits) superimposed upon a radio or any other carrier wave. A person having ordinary skill in the art would appreciate that a carrier wave is electromagnetic energy propagated from a source by radiation, optical or conduction waves and is suitable for embodying an information-bearing signal, such as a computer data signal. In one embodiment, a carrier wave behaves, or is modulated, according to a network protocol, such as Ethernet, IEEE 1394, TCP/IP, or any other communication protocol, so as to include computer data information. The carrier wave can be, for example, a direct current, an alternating current, or a pulse chain. In modulation of the carrier wave, it may be processed in such a way that its amplitude, frequency, or some other property varies so as to embody data for transfer.

In the figures, distinct instances of like objects are distinguished with parenthetical indices. For example, user computer 12 might refer to 12(1) or 12(2). In this example, 12(1) refers to an inviter client operated by an inviter, who invites a user operating invitee client 12(2) to join a game. In a typical system, there may be many inviters, many games and many invitees. Also, if allowed by a game, an invitee might be an invitee in one instance and later be an inviter. As shown in FIG. 1, invitee client 12(2) is in a state prior to being invited and joining a game.

Game server 14 can be a conventional game server or one specially designed for this application. A typical game server maintains data, such as game state, user position, and user statistics, for active users participating in a game. While data storage for only two games are shown in FIG. 1, a game server often hosts many more simultaneous games. A game server might be referenced by a URL for the game server, with a specific port reference or URL string that specifies a specific game in progress. The reference to the game being served to client 12(1) is known to a game client 20(1) running on client 12(1), or can be obtained by game client 20(1). As shown, a messenger client 22(1) is also running on client 12(1) and is capable of receiving an operating system ("O/S") message from game client 20(1).

As shown, messenger clients 22 are coupled to messenger server 18 for sending messages, such as instant messages, between clients 12. Messenger server 18 is shown with two databases, a buddy list database and a user list database. Generally, the user list database maintains information about a user, such as their connection address and their connection status (i.e., off-line or on-line). Buddy list database maintains a list, for each enrolled user, of other enrolled users that the user wishes to notify when they are online, typically friends, family and other users with which the user associated with the buddy list has chosen to alert when the user is online. Thus, if a user A were to get online and if user B is on or is associated with user A's buddy list, then user B would be notified when User A is online, affording user B a chance to send an instant message to user A when user B is online and notified that user A is also online. It should be understood that the databases can be embodied in many different forms of data structures, such as relational tables maintained by a relational database management system or text files containing data in predetermined formats.

Figure 2:
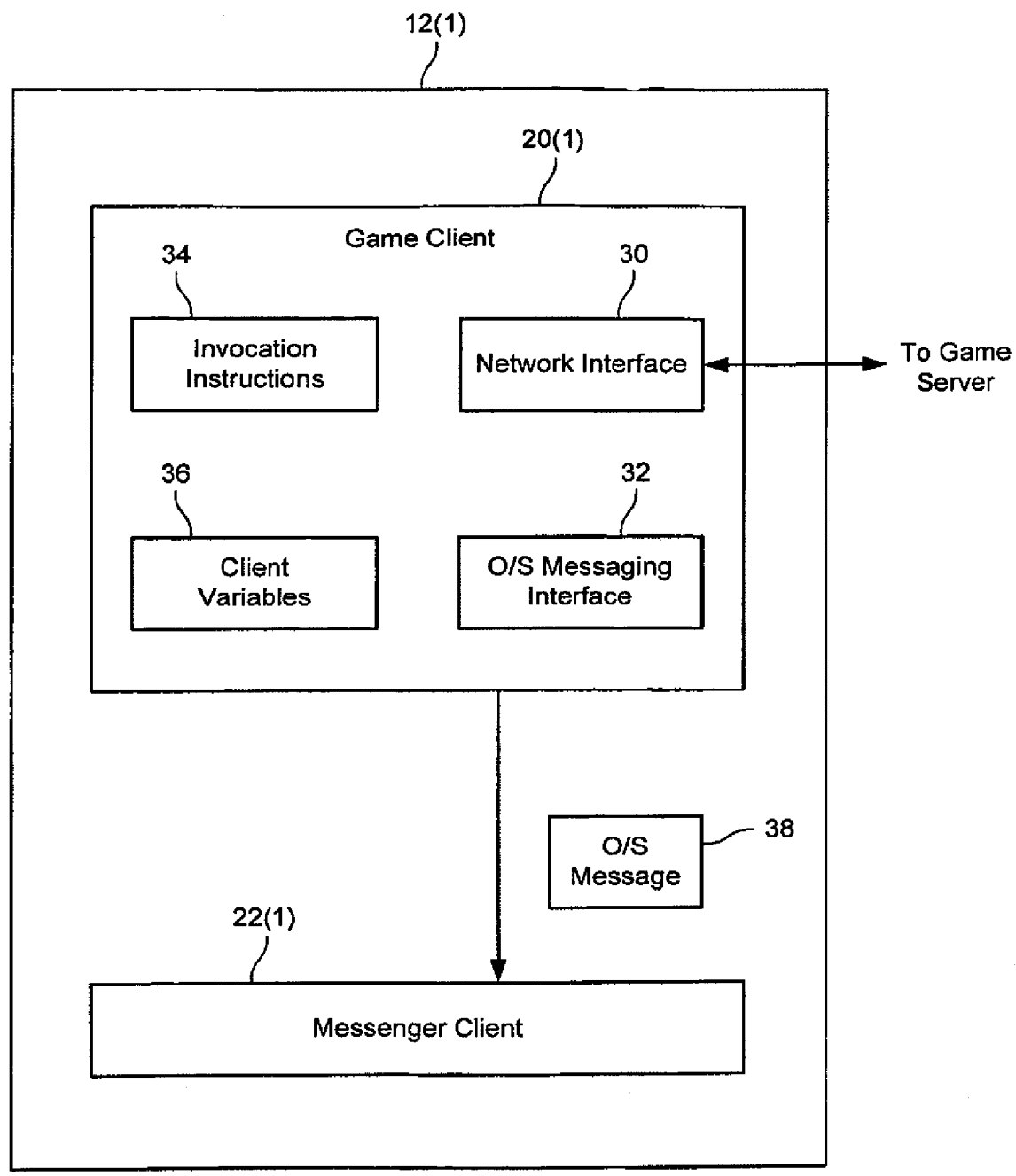
FIG. 2 is a block diagram showing the inviter client of FIG. 1 in more detail.

Referring now to FIG. 2, additional details of a game client and a messaging client are there shown. Game client 20(1), in this case the inviter game client, is shown including a network interface 30, an O/S messaging interface 32, invocation program code 34 and client variables 36. Network interface 30 connects game client 20(1) to network 16, in turn connecting game client 20(1) to a game server. O/S messaging interface 32 allows game client 20(1) to send messages to other processes running on client 12(1), such as a messenger client. Invocation program code 34 is information usable by an invitee to invoke their own game client and connect to a game in which game client 20(1) is currently playing. Client variables 36 include data (i.e., game data) such as an identifier of the particular game being played and how to invoke the game client.

This game data can be provided in an O/S message 38 to messenger client 22(1). Where a multiplayer game is already written, it can be simply retrofitted by the maker of the game to output O/S message 38 when a messenger client is running in a space reachable by O/S message 38, typically running on the same computer as the game client. For example, a small subroutine might be added to a game client such that upon initiation of the game client and connection to a game server the game client checks for the presence of a messenger client (or at least the ability of a messenger client to receive a message) and, if present, sends an O/S message containing invocation data (described in more detail below, with reference to FIG. 5).

Figure 3:
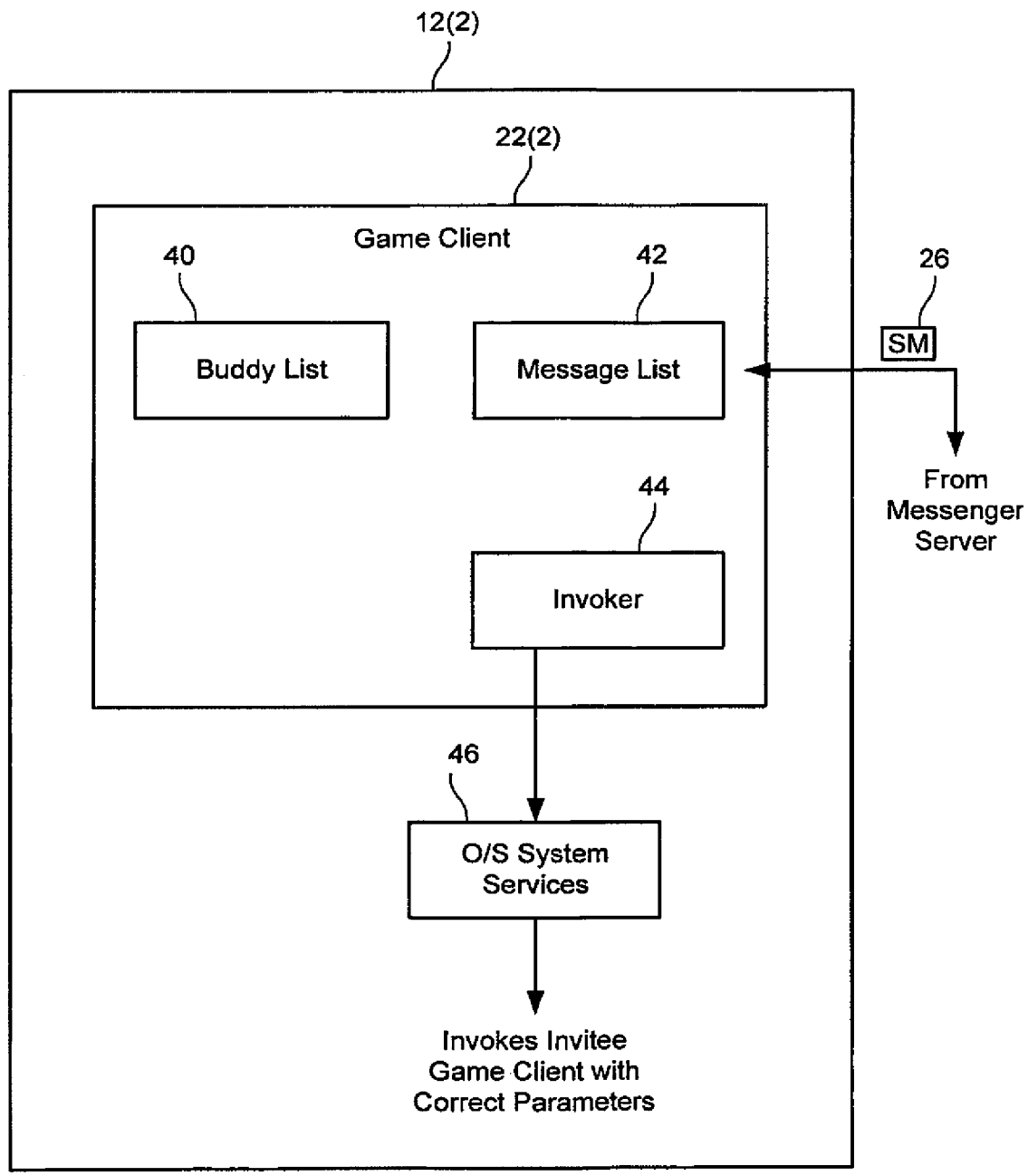
FIG. 3 is a block diagram showing the invitee client of FIG. 1 in more detail.

As shown in FIG. 3, a messenger client 22(2) running on an invitee client 12(2), is coupled to receive messages, such as state message 26 indicating that a particular buddy changed state (e.g., changed from online to offline or any other state relevant to the game-messenger application). Messenger client 22(2) is shown including a local copy of a buddy list 40, a message list 42 and invoker program code (an "invoker") 44. When messenger client 22(2) receives a state message indicating that an inviter has joined a game, messenger client 22(2) changes the status of that inviter in buddy list 40 and may add a message to message list 42. The status message can be construed as an invitation, but it might just be construed as an indication or a notice to the buddies of the inviter that the inviter is playing a particular game, as well as an indication of how to join the game.

If the invitee opts to join the game, invoker 44 handles sending an invocation command to operating system services 46. In one embodiment, game programs are invoked using command lines and registry entries and the invocation parameters are sufficient to join the game client to the correct game at the correct server.

Since the game clients are preferably provided from a common source, the O/S message sent from the inviter game client to the inviter messenger client can easily be designed to contain enough information to invoke that game client on another machine, assuming that the invitee owns and has installed the game client in a condition to be invoked on the invitee client. Also, if the game clients are provided from a common source, the messenger clients and servers do not have to necessarily understand the contents of the message or specially process the message, except for the optional display of a game-specific icon. Of course, a good security design for a messaging system would require that the messages conform to some limits set by the system to control the uses of the messaging system. The messages might be constrained to conform to the formats shown for the returned file described in more detail below.

Where invocation information varies from client to client, such as where the invocation might depend on the installed directory location for the game client executables, that information can be stored in a registry or similar construct and be referenced by the game client installation using a reference that is common, or at least known, to other game clients.

Figure 4:
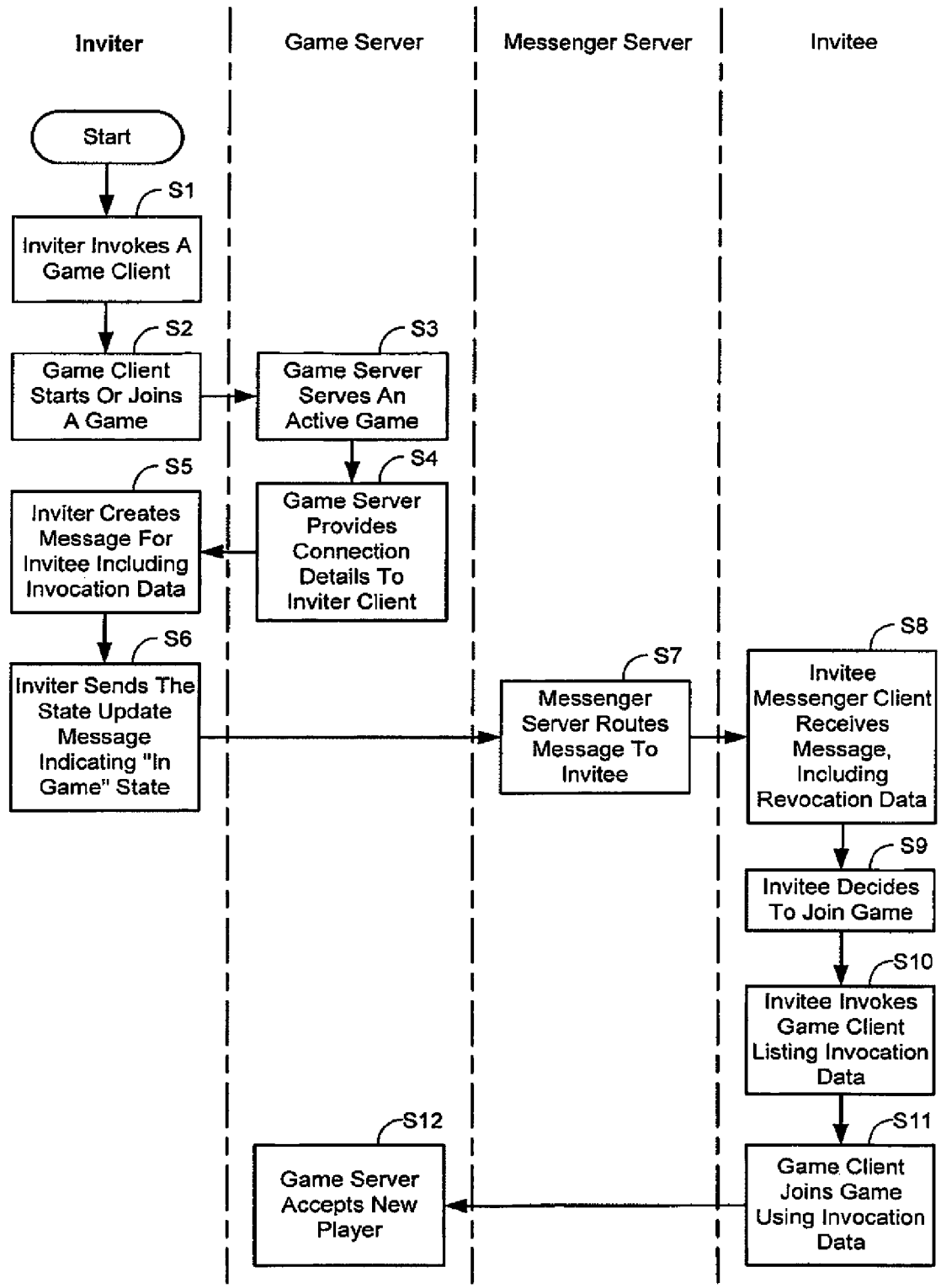
FIG. 4 is a flowchart illustrating actions of an inviter client, a game server, a messenger server and an invitee client, as part of a process of inviting an invitee into a game and having the invitee join the game.

Referring now to FIG. 4, a flowchart there shows one series of steps, labeled S1, S2, etc., in the order most likely to be carried out, for a method of invoking a game at an invitee client. In step S1, the inviter client invokes a game client. As explained elsewhere, the inviter might have been itself an invitee. At step S2, the inviter's game client connects to a game server to join or start a game. In response, the game server serves up an active game (S3) and provides (S4) the inviter with enough information, such as IP address and port number, so the inviter can play the game.

The inviter game client then checks for the availability of a messenger client and, if a messenger client is such that it can receive a message, the game client creates a message (S5) and sends the message to the messenger client. The messenger client then sends the message to the messenger server (S6), which then forwards the message to all the online users on the inviter's buddy list (S7). In some variations, the message is only forwarded to select users from the buddy list.

When the invitee receives the message (S8) and the invitee decides to join the game referenced in the message (S9), the invitee's messenger client sends an invocation message to the operating system services of the invitee client with enough information to invoke the game client and point the game client to the game the inviter is playing (S10). The invitee thus joins a game (S11) and the game server serves that joined client as one of the players (S12).

When a client ends a game or terminates a game client, the game client might also include code that executes just before the game client terminates. Such code might generate a message similar to an invocation message and cause the messenger client to send a message indicating the new state (e.g., "out of game") to the buddies, to inform all that one of the game players is no longer actively in the game. Such a message is also useful for providing some indication, or reversal of a prior indication, at the invitee messenger client that there is no longer a game in which to be invited. One possible implementation is to change the icon presented by the invitee messenger client from the game icon next to the inviter's name to a regular messenger icon next to the name of the inviter (now just a messenger buddy).

FIG. 5 shows one example of what invocation message 24 might look like. As shown there, following a message header, the message includes a game identifier, GameID, with a value of "ChaseandRace2000" indicating the game that is to be invoked (and, of course, the game from which the message originated). The message also includes a game identifier (Game#=176), an invoking command line (commandline="+ connect IP:192.168.0.17:28001"), a server descriptor (ServerDesc="The Game Server"), a registry entry for handling client specific details (RegistryEntry=" . . . /software/ChaseandRace/Location"), a fallback URL to be presented to the invitee that tries to join a game but does not have a game client "(FallbackURL=" . . . /nogameinstalled.html"), a version number and a state value.

Figure 6:
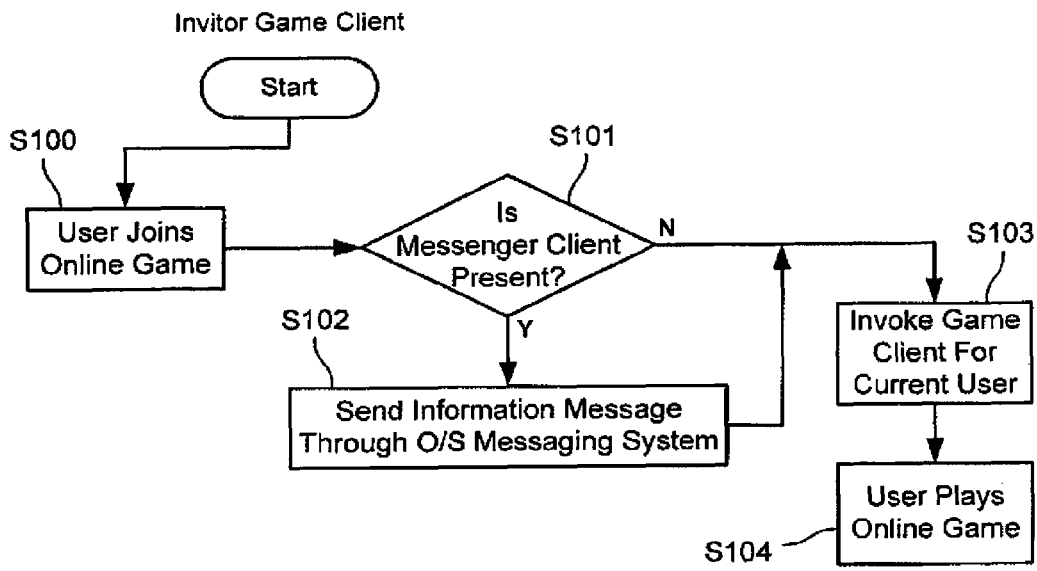
FIG. 6 is a flowchart of a process used by a game client to send a message if a messenger client is available.

FIG. 6 shows a flowchart illustrating an exemplary method of invoking an inviter's game client according to the present invention. FIG. 6 shows but one series of steps and/or acts (of many alternative steps and/or acts) in an order most likely to be carried out. For example, at S100 a user joins an online game. After joining the game, it is determined if a messenger client is present at the user's end (S 101). If so, an invocation message is sent through the O/S messaging system (S102). If a messenger client is not present, the process moves on to step S103, where a game client is invoked for the user. Additionally, after sending the invocation message, a game client is invoked for the user (S103). The user can then play the online game (S104).

Figure 7:
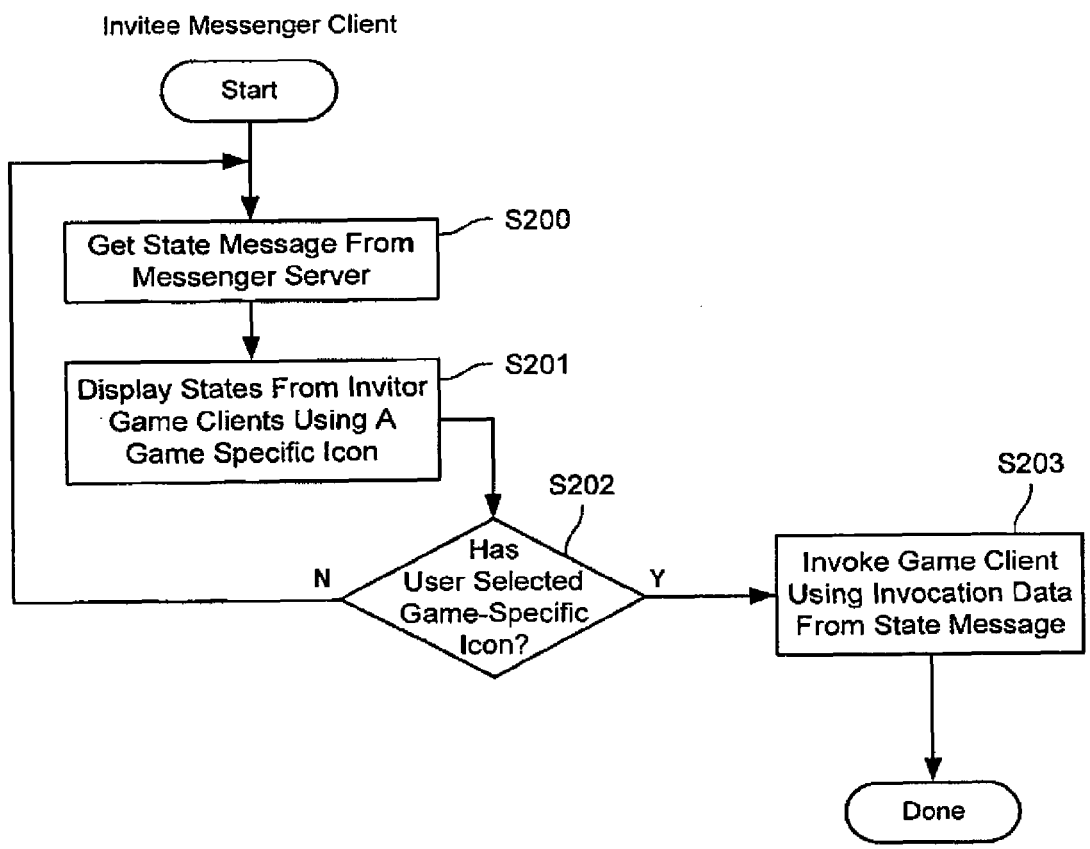
FIG. 7 is a flowchart of a process used by an invitee messenger client to display messages from invitees and invoke games.

FIG. 7 is an exemplary flowchart depicting a method used by an invitee messenger client to display messages from invitees and invoke games, according to one embodiment of the present invention. In S200, the user gets a state message from the messenger server. States of other inviter game clients or other game clients playing the game are displayed using a game specific icon (S201), where such states include "available," "invisible," "unavailable," "playing a game," etc. At S202, the process determines if the user has selected the game-specific icon. If not, the process moves back to S200, to retrieve a state message from the messenger server and update the states of other game clients. However, if the game-specific icon is selected, a game client of the invitee is invoked using the invocation data from the state message (S203).

Thus, the game client might send the Y! Messenger a state message such as that shown in FIG. 5, or a similar state message with more or fewer fields. The Y! Messenger client forwards this information to the user's friends (i.e., those enrolled Y! Messenger users that are on the sender's buddy list), and then each friend's Y! Messenger client validates the game by looking up the game name with a Yahoo! web server. This step is optional but preferred, since it would serve to prevent someone from making up destructive games and having the destructive game unwittingly executed by recipients of the state message.

In a specific embodiment, the game clients use Yahoo!'s Y! Messenger clients and servers to send state messages to allow a potential player to view their friends' state, i.e., which game, if any, the friend is playing. The process is transparent to both the inviter and the invitee, if desired. For example, the invitee client could be configured to send out a state message any time the invitee joins an online, multiplayer game, thus being transparent to the inviter. The process can also be transparent for the invitee, as the invitee need not know the details of how to invoke a game client or how to find and connect to the game server the invitee's friend is currently engaged with.

Figure 8:
FIG. 8 shows an example of a user's messenger window as displayed on an user interface.

FIG. 8, for example, shows a buddy or friend list for "debbie95055," which is shown as a messenger window in a graphical user interface. The friend's list of debbie95055 includes "brian_the_dork," "priscillalus," and "tom123494949" and represents users brian_the_dork and priscillalus as being offline (i.e., in offline state) with a "sleeping" face adjacent to their user identifier (e.g., Yahoo! ID). User "tom123494949" is represented as being online (i.e., in online state) with a "smiley" face displayed adjacent to the user's identifier for tom123494949. The friend's list shown in the exemplary instant messenger configuration is implemented in a proprietary messenger service, such as Yahoo! Messenger.

Figure 9:
FIG. 9 shows an example of an invitee's messenger window configured to receive a notification or invitation to play a game.

In FIG. 9, debbie95055's messenger window is configured to show when one of debbie95055's friends is engaged in a game with Y! Messenger running and connected to the Internet, for example. Regarding FIG. 9, tom123494949 is shown to be a friend of debbie95055 and is associated with debbie95055's buddy list. While tom123494949 is playing a game, such as "DumbChat," tom123494949's engagement in playing a game is shown, for example, in parentheses or in connection to a game-related icon adjacent to the player's identifier. For example, as tom123494949 enters a game to play, the "available" smiley indicator next to tom123494949's user identifier of FIG. 8 switches to an activity name in which tom123494949 is interacting with as shown in FIG. 9. In this case, debbie95055 might be considered an invitee and hence is notified of another's action of playing a game. Tom123494949 then might be considered to be the inviter that transparently notifies tom123494949's friends that he/she is playing a game a that point in time.

Figure 10:
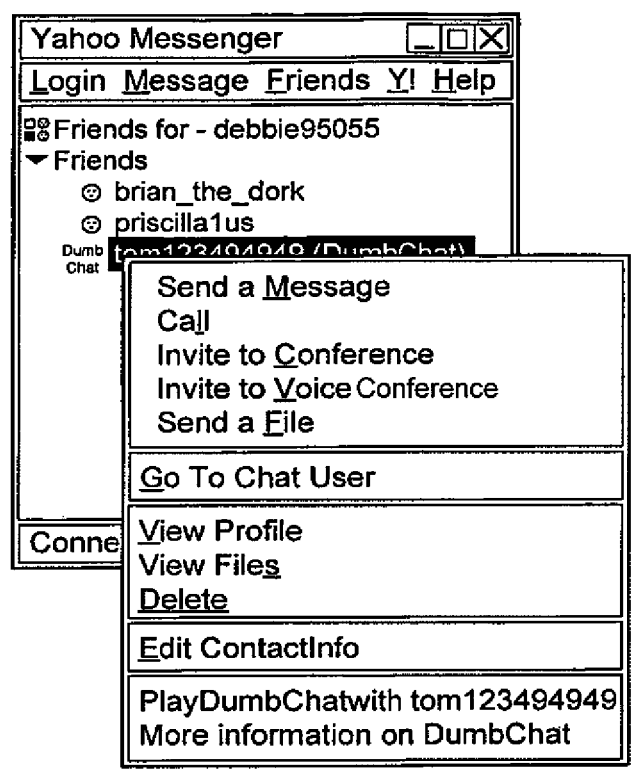
FIG. 10 shows an exemplary invitee's messenger window as displayed on a user interface for participating in a game.

FIG. 10 shows an exemplary invitee's messenger window as displayed on a user interface, for example. When a Y! Messenger user such as debbie95055 notices an icon change and sees what game is being played by a friend, he/she will be able to also easily join that friend. For example, as shown in FIG. 10, debbie95055 need only right-click on that friend's identifier, such as tom123494949. When right-clicking on the gainer's ID "tom123494949," user debbie95055 will be presented other options, such as "Send a Message," "Invite for conference," "Invite for voice conference," and "Send a file." In one embodiment, there is also a another menu option for joining the friend's game and getting more information about the game that the friend is playing.

In this example, user Tom (associated with ID tom123494949) is playing a game called "DumbChat" on an Internet server, and he has Y! Messenger running on his machine. User Debbie (associated with ID debbie95055) sees on her Y! Messenger that Tom is playing DumbChat (by the change in icon and text surrounding his name) and she decides she wants to surprise him by jumping into the game. She right-clicks on his name in her friends list, and chooses the menu option "Play DumbChat with tom123494949."

In another embodiment, prior to Y! Messenger displaying the game's icon in a person's friends list, Y! Messenger will actually check a user's computer to see if they have the correct game installed. If the game is installed, then the "Play <Game Name> with . . . " and "More Information on . . . " options are made available in the right-click menu. If a user does not have the correct game installed, the only game-related option available to present such a user is the "More Information on . . . " selection in the right-click menu.

Returning to the Tom and Debbie example, once Debbie chooses "Play DumbChat with Tom" from the right-click menu, Y! Messenger starts the DumbChat game executable with the correct command line arguments to connect her to the same game server where Tom is playing.

In yet another embodiment, a preference setting allows a user to choose whether or not people on a friends list is able to see a game participant's gaming status. For example, a user may "invisibly" (i.e., without notifying the other friends on the list) play a game by indicating as such by checking or un-checking a box (in a privacy category, for example). Such an action will determine whether people on your friends list will be able to see your gaming status. If a message or other Y! Messenger-spawned event occurs while a user is playing a game, Y! Messenger will not take the focus away from a player's game. That is, a game player need not shut down a messaging client before playing games. The messages that come in while a user is playing a game will be waiting on the desktop for the player.

In a specific embodiment, a game manufacturer would include a small subroutine or section of code that sends a message to the Y! Messenger window, if the game exists on a client machine, with the game manufacturer including in the message any information needed to invoke the game client at another location and connect to the same game and game server as the game client sending the message. Accordingly, an entity such as Yahoo! generates a SDK under the trademark name of GameProwler™ and distributes the SDK to third party game developers to include the developer's new game server, for example, for use with the entity's web server (e.g., Yahoo! web server)). GameProwler includes various embodiments of the method and system of the present invention, as described herein.

The Yahoo! web server (or the message itself, preferably validated) provides several pieces of information about the game, including a registry key which points to the an executable to launch to invoke the game, a URL to launch if the game isn't installed (fallback message), and the icon to display on the friends' Y! Messenger clients next to the name of the game player (inviter). The friends can then select the user and join their game, which will launch the executable pointed to by the registry key, with the command line parameters as sent by the original game. If the game is not installed, Y! Messenger launches the game-specific URL in the default web browser.

In a specific embodiment of a user client having a windowing environment and a window messaging system, the game program grabs a handle for the Y! Messenger, and then sends a registered window message with a string encoding the game data, such as:

```
HWND hwnd = the window handle to Y! Messenger
UINT wm = RegisterWindowMessage("Yahoo! Messenger Game
   System");
ATOM a = GlobalAddAtom("l\tChaseandRace3\ti\t0\t +connect
   192.168.0.17:28001\tCrusher.dm CTF r001z");
PostMessage(hwnd,wm,a,0);
```

If the ATOM value needs to be longer than is allowed by the window messaging system, the game client can be programmed to output the game invoking data to a file and pass the file name to Y! Messenger.

Figure 11A:
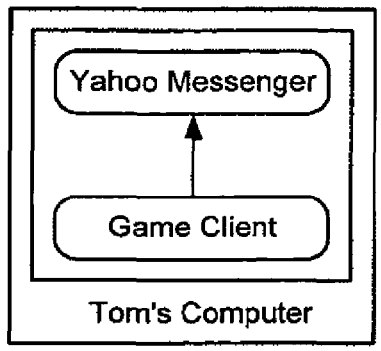
FIGS. 11A-E are simplified block diagrams of an exemplary game-messenger system.

FIG. 11A depicts a simplified game-messenger client according to the present invention. Further to the Tom and Debbie example, GameProwler according to the present invention includes information sent by a game client to Y! Messenger. The communication between the game client and the Y! Messenger client is performed by the following exemplary tiny bit of code provided by Yahoo! in the GameProwler SDK:

```
ATOM atom;
HWND ym_wnd = FindWindow("YahooBuddyMain",NULL);
if (ym_wnd != NULL)
{
    UINT wm = RegisterWindowMessage("Yahoo! Messenger Gaming
    System");
    atom = GlobalAddAtom(s);
    PostMessage(ym_wnd,win,atom,0);
}
```

This code fragment is design to find the Y! Messenger client window, if it is running. It then registers a string in the global Windows string table and sends the atom for that string in a registered message to Y! Messenger. Y! Messenger looks up the atom with the system, and gets a copy of the original string. The actual string that is sent to Y! Messenger is built from a helper function (not shown). It includes a short game name, the command line to launch to the same game server, a description of the particular game server, and some flags. A helper function takes those parameters and builds them into one string.

Exemplary GameProwler code is contained in files, such as ymessage.c and ymessage.h. A game developer then may compile and link ymessage.c into a game and include ymessage.h. The complied files include, for example, prototypes for at least two functions that are needed to call from a game developer's game: YahooMessengerConnect( ) and YahooMessengerDisconnect( ), for example.

When a game connects to a game server call YahooMessengerConnect( ), at least four of following parameters are employed according to a specific embodiment, as similarly depicted in FIG. 5. First, a game parameter is used to identify the game with a short name of the game containing lowercase letters and numbers. This name must be unique among all games that support GameProwler. Second, a command line is used to launch another copy of the game to the same game server. Third, a description of the particular game server that a player-client is connected to. And, fourth, one or more flags include game type flags, such as YMESSAGE DO NOT DISTURB for all standard games. On the other hand, when the game disconnects from a game server (including if the user quits the game entirely) call YahooMessagerDisconnect( ) is activated with the short game name. This call is also used to resolve a user's state if the game quits without calling YahooMessengerDisconnect.

Figure 11B:
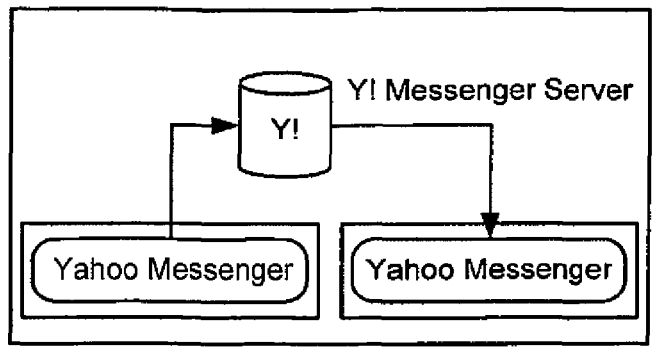

When the Y! Messenger client receives a message from a game, it either throws it away, or forwards a state message to an arbitrary subset or all of the buddies listed as buddies of the inviter, based on user settings as shown in FIG. 11B. The message from the game to the inviter messenger client is discarded if the user has disabled the system by setting an option. This is useful to give the user an option of not notifying buddies of the game play. The buddy list is stored on the client and the server. Each of the friends' Y! Messenger clients must then verify the legitimacy of the data, to ensure that it will only launch legitimate games. This verification is done through, for example, a secondary lookup to a Yahoo! Web server of FIG. 11C based on the short game name.

If forwarded, the Y! Messenger client sends a state message on to the Y! Messenger server and from there on to the specified buddies. The updated state of the inviter can, but need not be, stored on the messenger server. If a buddy logs on with their messenger client, each buddy is notified of the new state (e.g., "logged on"). If one of those notified buddies is in a game, that buddy's messenger will send back a message to the newly logged on user with the game information so the newly logged on buddy will have the information to display a game icon, invoke a game, etc.

An optional census process can run on the messenger server to roughly track usage of the game-messenger invocation. One way to implement this feature is to have the invoking messenger client set an internal flag and watch for the O/S message that the game client normally sends to the messenger client when the game starts up and detects the messenger client. When the messenger client receives that message from the game client, the messenger sends the message to the messenger server and includes the state of the flag. After sending that message, the messenger client resets the flag.

Using such a mechanism, the messenger server will receive messages from many messenger clients that include invocation instructions. Where the game was invoked directly by the user, the flag is not set and where the game was invoked from the messenger client, the flag is set. While there may be some cases where the flag is not entirely accurate, this census is accurate enough for many purposes. When a game is invoked from the messenger, the computer fails before the game client sends its O/S messenger and then later the user invokes the game client directly, the message to the messenger server will incorrectly indicate that the game was invoked from within the messenger client, but such instances are likely to be rare enough to not significantly effect the statistics gathered. The count of set flags and reset flags can be used to count the number of times the messenger-game system is used and on which games.

When an invitee messenger client receives a message that a buddy is playing a game, the invitee messenger client decodes the message as needed to invoke the game and optionally send a message to the census process. For example, the invitee messenger client might send an HTTP request, prior to invoking the game, to the URL http://<messenger-domain>/messengergames/lookupname.txt?v=1, where the "?v=1" part of the URL specifies the version number of the messenger client being used by the invitee. The server name (<messenger-domain>) should be configurable on the inviter and invitee clients, to allow game developers to test their game clients and the game-messenger system locally on their network. The configurability might be provided by using a registry entry to specify the domain and filename portion of the URL. Preferably, if the server name <messenger-domain> is not a subdomain of the operator of the messenger service, the messenger client would warn the invitee client user that the game to which the invitee is being invited has not been verified by the messenger service operator. That step would reduce the incidence of malicious network users sending invitations to join online games that have undesirable or unintended effects on the invitee. This step would also serve to remind game developers to register the game with the messenger service operator for verification before releasing the game to the users.

When the invitee client gets the state message from an inviter client, it looks up data about the game from a game data server. The game data server might be a Yahoo! HTTP server where the game data is "looked up" by downloading a text file from a HTTP server using a standard http lookup. The game data file can be a unix formatted text file, with one field per line. The fields present in the same data file might depend on the values of fields of the message. A few examples are shown below. For example, the file might begin with a field called "tag" that signals whether the game entry is valid (tag=1), if the game entry is an invalid executable game entry (tag=2) or if the game entry is a valid URL game entry (tag=3). Thus, the file tag=2 would indicate that the game is not supported. Note that no other fields are present, or needed, in such a file. If an invitee messenger client receives such a file, the client will just discard the game info for the buddy inviter. Another file

```
tag=1
icon=<iconfile>.bmp
regkey=<RegKeyForGame>
fallbackURL=<fallbackURL>
infoURL-<moreinfoURL>
menutext=<play game text><inviterID>
infomenuitem=<infotext>
``` would be interpreted by the invitee messenger client as a reference to a valid game that is executable locally. In that message, the icon field references a (local or remote) URL of a bitmap of the icon of the game to be displayed by the invitee messenger client. The bitmap might be a 16 by 16 pixel array having up to 256 colors with a particular color, such as magenta, being interpreted as no color (i.e., transparent). The regkey field indicates a registry key that contains a fully qualified path and executable to run to invoke the game client at the invitee client. The fallbackURL key provides a reference to a URL to launch if the game client is not installed and the invitee user tries to join his/her buddy in the game. In this example file, labels enclosed in "<>" represent space holders for text or numbers who's actual value is not relevant here. The file also includes a reference to a URL to launch if the invitee wants more information about the game (infoURL), text for menu item the invitee would use to launch the game (menutext, example: "Play game X with % s") and text for menu item for more game info (infomenuitem).

Yet another file is

```
tag-3
icon=<iconfile>.bmp
gameURL=<URL>
fallbackURL=<fallbackURL>
infoURL=<moreinfoURL> menutext=%N<inviterID>
infomenuitem=<infotext>
``` where several of the fields are the same as a tag=1 file, but the gameURL field provides a prefix of a URL used to load the game client at the invitee client.

The invitee messenger client can cache this information about a game for every message it receives about a friend playing each game while the messenger client is operating. If a valid game data file is returned from the game data server, the invitee messenger client retrieves the game icon and displays it next to the buddy's name, in place of the standard messenger icon, such as the "smiley face" icon. If the invitee user pauses a cursor over the buddy's name or game icon, a tooltip might pop up with the description of the game. The right click menu for the buddy might have, two extra entries, one for launching the game and one for more game information, as specified in the fields of the sent file.

Figure 11C:
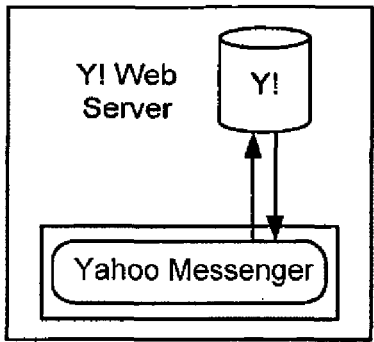

Returning to the Tom and Debbie example, FIG. 11C shows an exemplary web server used for verification purposes, among other things. According to this example, Y! Messenger retrieves the URL by default by using exemplary URL: http:gameprowler_yahoo_com/messengergames/ shortname_txt?_msg ver=3,0,0,838, where underscores are understood to represent "dots." The text after the question mark is designed to change with future versions of Y! Messenger.

The web server may return a text file including several lines of data. The first line contains the character "1", meaning a standard game. The second line contains a URL to a bitmap to show next to the game player's name in the friend list. This bitmap must be a standard 16×16 256-color .bmp file. For example, pure magenta specifies transparency. A third line contains a registry key that points to a path that Y! Messenger will set as the current directory before launching the game. A fourth line contains a registry key that points to the fully qualified path of the executable to launch. A fifth line contains the URL to a Yahoo! web page to launch if Y! Messenger is unable to launch the game. A sixth line contains the URL to a Yahoo! web page to launch if the user wants more information about the game. A seventh line contains the menu text to display to play the game (with % s representing the friend's name), and an eighth line contains the menu text to display for more information. Additional lines to enhance functionality or fewer lines to reduce quantity of data exchanged is within the scope of the present invention.

In this example of Tom and Debbie, the DumbChat sample program developed in connection with the GameProwler SDK uses the short name "dumbchat," and corresponds with a URL http:gameprowler_yahoo_com/messengergames/ dumbchat_txt. An exemplary, program includes the following:

```
1
DumbChat
http://gameprowler.yahoo.com/messengergames/icons/dumbchat.bmp
HKEY_CURRENT_USER\Software\Yahoo\DumbChat\Path
HKEY_CURRENT USER\Software\Yahoo\DumbChat\Executable
http://gameprowler.yahoo.com/messengergames/dumbchat-
    missing.html
http://gameprowler.yahoo.com/messengergames/dumbchat.html
Play DumbChat with %s
More information on DumbChat
```

For development purposes, a game developer may configure a specific Y! Messenger to retrieve game information from a local web server. Using the system registry editor, change the value of HKEY_CURRENT_USER\Software\Yahoo\Pager\Game\ Server to a web server on a network. If necessary, installation of a Personal Web Server (for Windows 9x or Windows NT) might be required. A registered game operable with Yahoo! might be required before a game is released for GameProwler to also work for a developer's users.

Figure 11D:
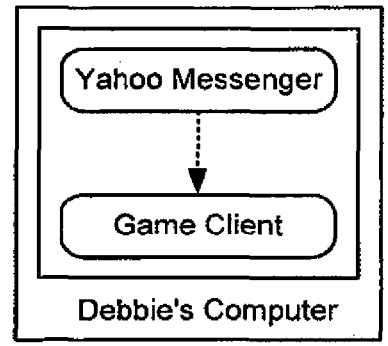
Figure 11E:
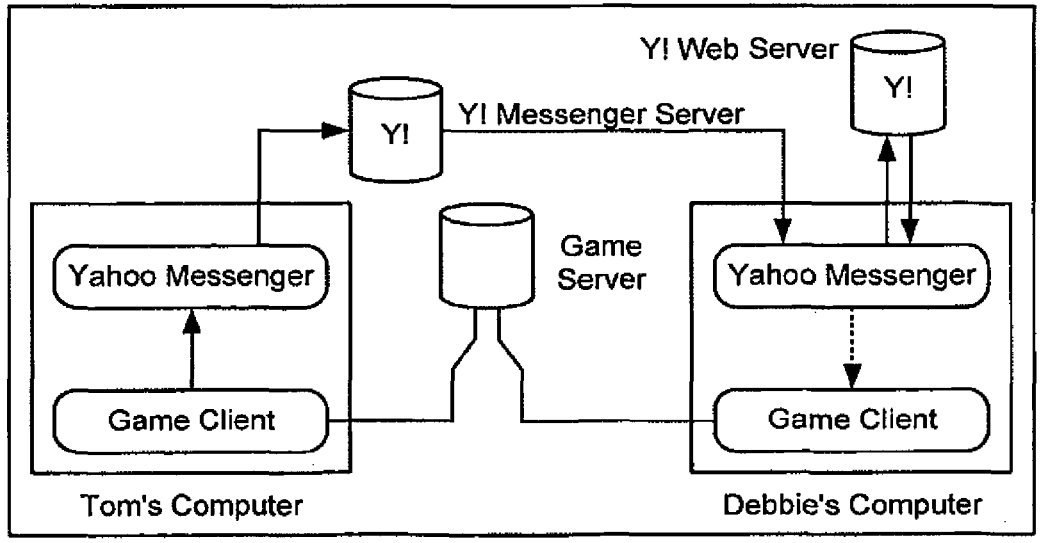

FIGS. 11D and 11E show an example of a game and a messenger client and an exemplary system, respectively. After a Y! Messenger client receives a game play message from a friend and verifies it with a web server, the game icon is displayed next to the friend's name in the friend list, as described in connection with FIG. 9. At this point, the game is ready to be launched. When the user right clicks the friend's name or game icon, the popup menu contains entries to play the game or get more information on the game. Selecting more information launches a web browser to a Yahoo! web page describing the game.

If the user tries to join the game, then Y! Messenger looks up the game's executable registry key, and tries to launch that executable with the command line specified from the friend. If this succeeds, the game will execute and should connect to the same game server as the friend. If the game launch fails, then there is an initiation of an indication of a setup error with the game. Y! Messenger launches a web browser to a Yahoo!

web page that will show both troubleshooting information and other general information about the game.

According to a method and system including an exemplary GameProwler development kit, such a kit includes a small amount of code that is preferably included in a developer's constructed game, as well as a sample chat program using this code called "DumbChat." To support GameProwler, a developed game preferably supports being launched with command line parameters to connect to a remote game server.

When a game player successfully joins a new networked game, a command line is used to launch his/her copy of the developed game. The player then connects to the same game server, for example. For many games, it would look like this:

+connect ip:port where ip is the IP address of the remote game server, and port is the port on the remote game server to send packets to. It is up to each copy of the game to interpret this command line correctly.

A game developer preferably builds up a string that describes the particular game server the developer is connected to. This could include information such as skill level, game name, game type (capture the flag, deathwatch, etc.), number of connected users, etc. Then, the game server takes this information and sends it to YahooMessengerConnect( ) like this:

---

YahooMessengerConnect("shortname",command_line,description,YMESSAGE_DO_NOT_DISTURB);

---

Preferably, a file ymessage.h (from the GameProwler SDK) is used to provide a function prototype having a YMESSEGE_DO_NOT_DISTURB constant. When the game disconnects from a network server (because the user quit, the application is closed, a network error occurred, or any other similar reason), call YahooMessengerDisconnect( ) is used to remove the game playing status like this:

YahooMessengerDisconnect ("shortname")

The above examples show fields in a "label=string" format. In some implementations, the labels are not present, but are inferred and the fields always appear in the same, predefined order.

If the invitee selects the menu item that launches a game client, then the messenger client attempts to execute the indicated program according to the game data file with the command line parameters sent by the buddy. If this fails, because the game program does not exist on the invitee client or for other failure reasons, then the invitee messenger client presents the fallback message. One method of displaying a fallback message is to launch a web browser with the fallback URL specified in the game data file. If the game is marked as a URL type game (tag=3), then the invitee messenger client it concatenates a URL suffix to the game URL prefix (gameURL) and launches a web browser with that concatenated URL. The URL suffix is passed by the inviter client, in lieu of command line parameters. If the user selects the "info-menuitem" menu item, then the specified URL is launched in a web browser.

A basic system for game-messenger integration and a few variations have now been described. Many variations of the basic system will become apparent upon review of the disclosure and some variations are described in detail below.

One such variation is where game clients are written using Java™ code. Since such game clients are typically invoked at a game server, to be executed on a client, a client-side O/S messaging might not be possible, since Java programs are designed not to be able to access certain operating system services. With such games, the communications paths can be modified from the system shown in FIG. 1 to the system shown in FIG. 12.

Figure 12:
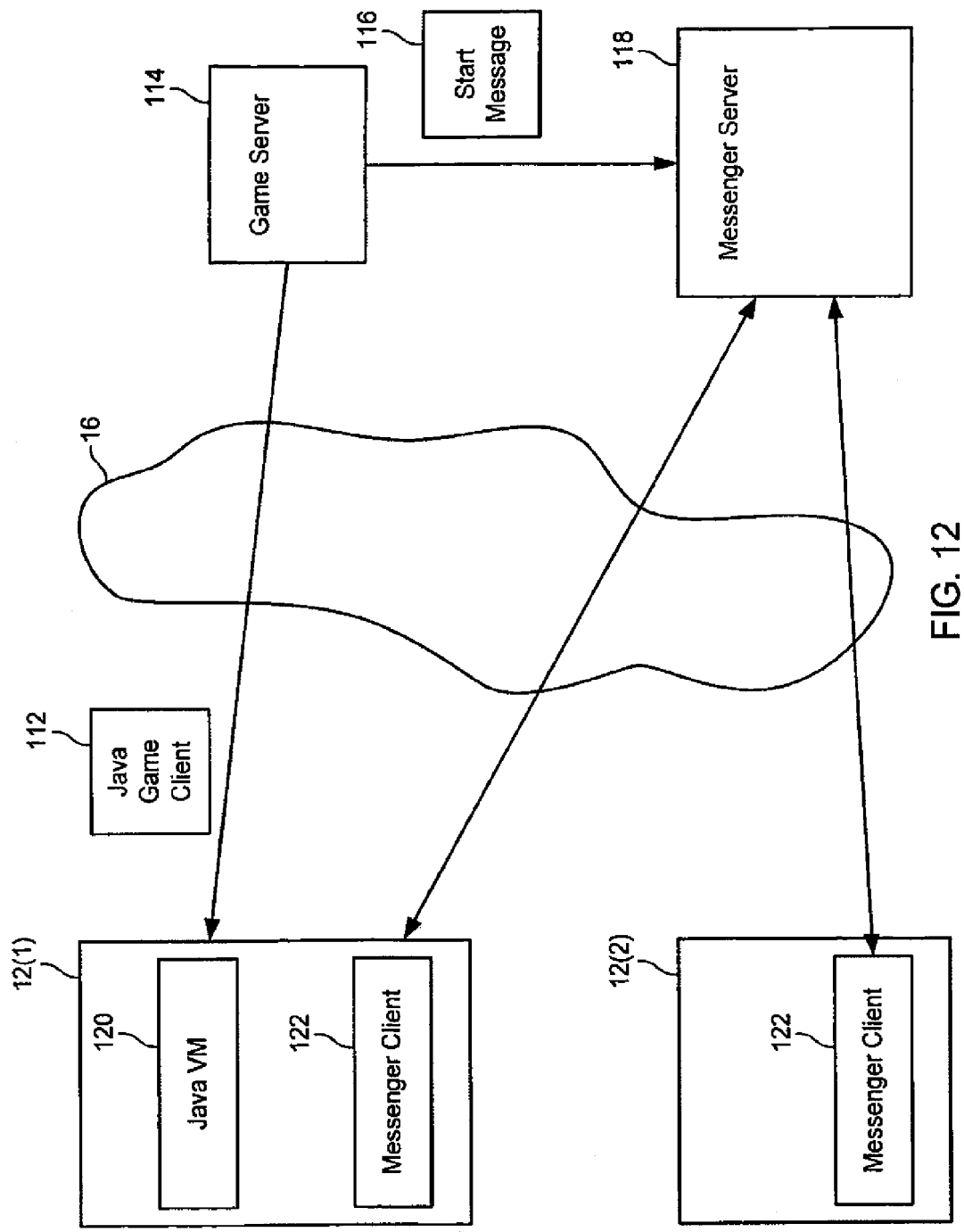
FIG. 12 shows another embodiment of the system according to the present invention.

FIG. 12 shows a client 12(1) starts a game by invoking it in a normal manner, such as downloading a Java program 112 embodying the game client from a game server 114 over network 16. When game server 114 serves the game client to an identified user using client 12(1), the game server also sends a message to a messenger server 118 so that messenger server 118 can send a state message to the messenger clients 122 of buddies of the user of client 12(1).

The game server might also send state messages when users leave a game. Such game server-messenger server messages might be HTTP messages. A game server can be operated by the same operator of the messenger system, such as the Y! Games servers and the Y! Messenger servers, or the servers can be independently operated.

In the Java variation, the game servers act like the messenger client, in that the game server duplicates the configuration of which friends to tell about the user's room changes. Thus, the game servers might need to hold onto more information than if the clients initiated the messages.

Besides just passively changing the state of a buddy's messenger client, the game message could also contain an "invite" flag. When the buddy's messenger client receives the game message, if the invite flag is reset, the buddy's messenger client just changes the state. However, if the invite flag is set, the buddy's messenger client invokes a dialog box with the game information and a button to accept the invitation to join the game. This invite flag feature could be extended to be used with other messenger users that use "fake" messenger clients that are actually software agents, such as a "tournament buddy" that would guide users through playing game tournaments, or a "chat events buddy" that would invite users to all chat events. This concept could be extended to non-game guiding of users throughout an online environment.

While the above description explains operating system-level messages from a game client to a messenger client, messages might also be sent in the other direction in some implementations. For example, when a game is a full screen application, it is not always desirable to have the messenger client pop up. In such environments, the game clients might be further modified to accept messages from the messenger client and display selected messages in the context of the game. With such a capability, two or more players of a game could be playing in one multiplayer game while each of them have their messenger client running in the background. When a messenger client receives a message from one of the other players, that message is forwarded to the game client of the recipient, which can display the message in the context of the game, and even allow the recipient to reply to the message in the context of the game.

Figure 13:
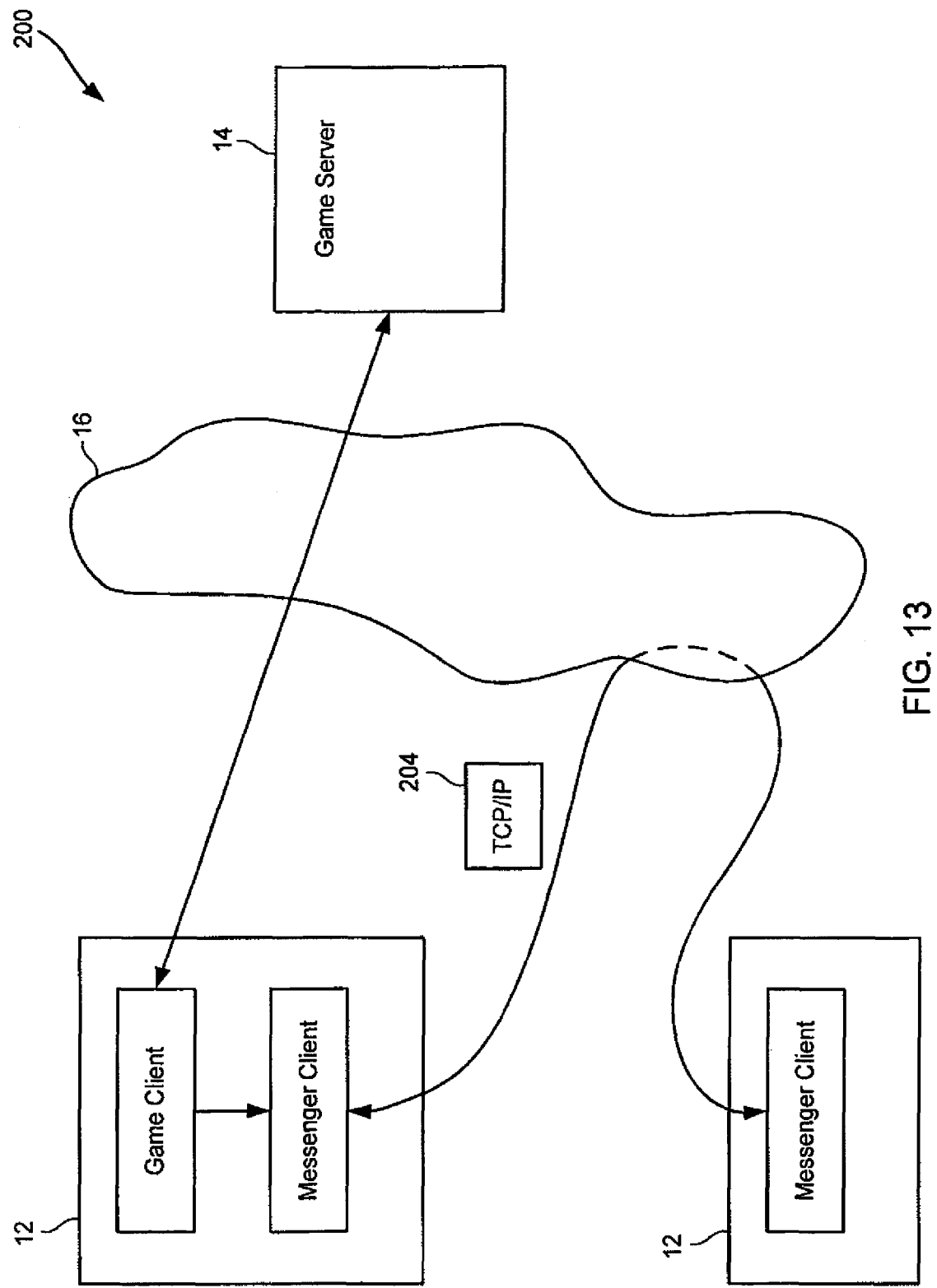
FIG. 13 illustrates yet another embodiment of the game-messenger client system, wherein messages between user clients are sent peer-to-peer.

FIG. 13 illustrates another variation of the game-messenger client combination. In a system 200 shown in FIG. 13, messages between user clients are sent peer-to-peer rather than going through a messaging server. One method of message transport is using TCP/IP packets, such as message 204, that are transported over network 16 between clients 12 directly, without needing an intervening server.

As mentioned previously, while the primary example described herein relates to games and one game player inviting other game players to join a game, where the invitation is delivered as a message that includes invocation instructions, the system would work well with non-game multi-user applications. For example, consider a whiteboarding application, used by multiple people in a collaborative drawing session.

The inviter in this case would be a user that is using a client-server whiteboard program that is preferably pre-enabled to send invocation messages. When the inviter makes an invitation, the inviter's messenger client sends a message to the invitees on the inviter's buddy list, who can then invoke the whiteboard application and connect to the correct session on a whiteboard server, all using the data provided in the message. Such an activity, whether whiteboarding, game or any other activity, may include an "activity client" and an "activity server" to effectuate an embodiment of the present invention.

Figure 14:
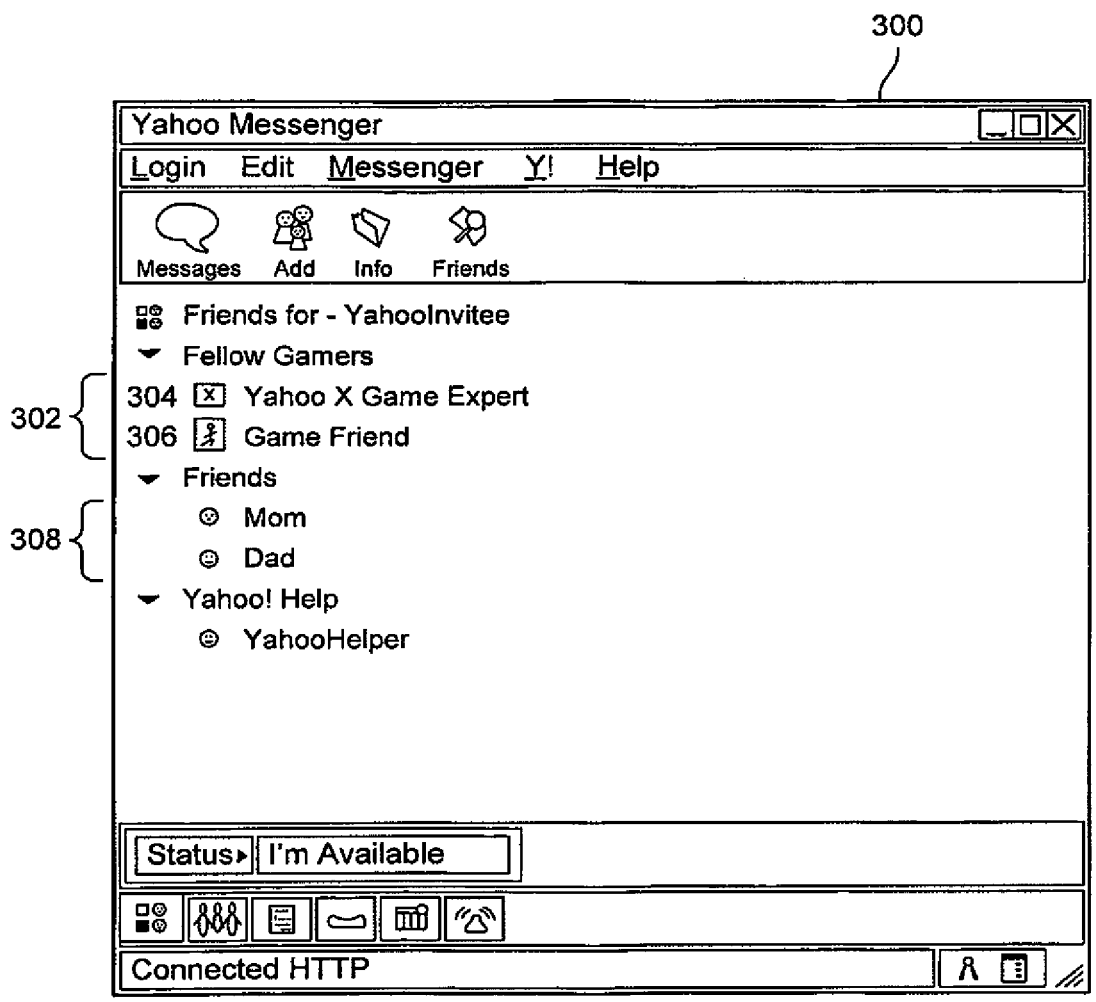
FIG. 14 illustrates a screen shot of an exemplary messenger window for an invitee messenger client.

FIG. 14 illustrates a screen shot 300 for an invitee messenger client according to one embodiment. As shown, the section fellow garners 302 includes a Yahoo! game expert icon 304 and game friend icon 306. The icons 304 and 306 can represent the status of the associated gamers. For example, the icons 304 and 306 can represent whether or not the garners are currently playing a game or alternatively, can represent whether a user is online or offline. Additionally, icons 304 and 306 can change when the status of the associated garners change. Friends 308 can include friends of the invitee. The friends 308 are friends the invitee can establish connections with where instant messages can be sent in between the invitee and friends 308.

Figure 15:
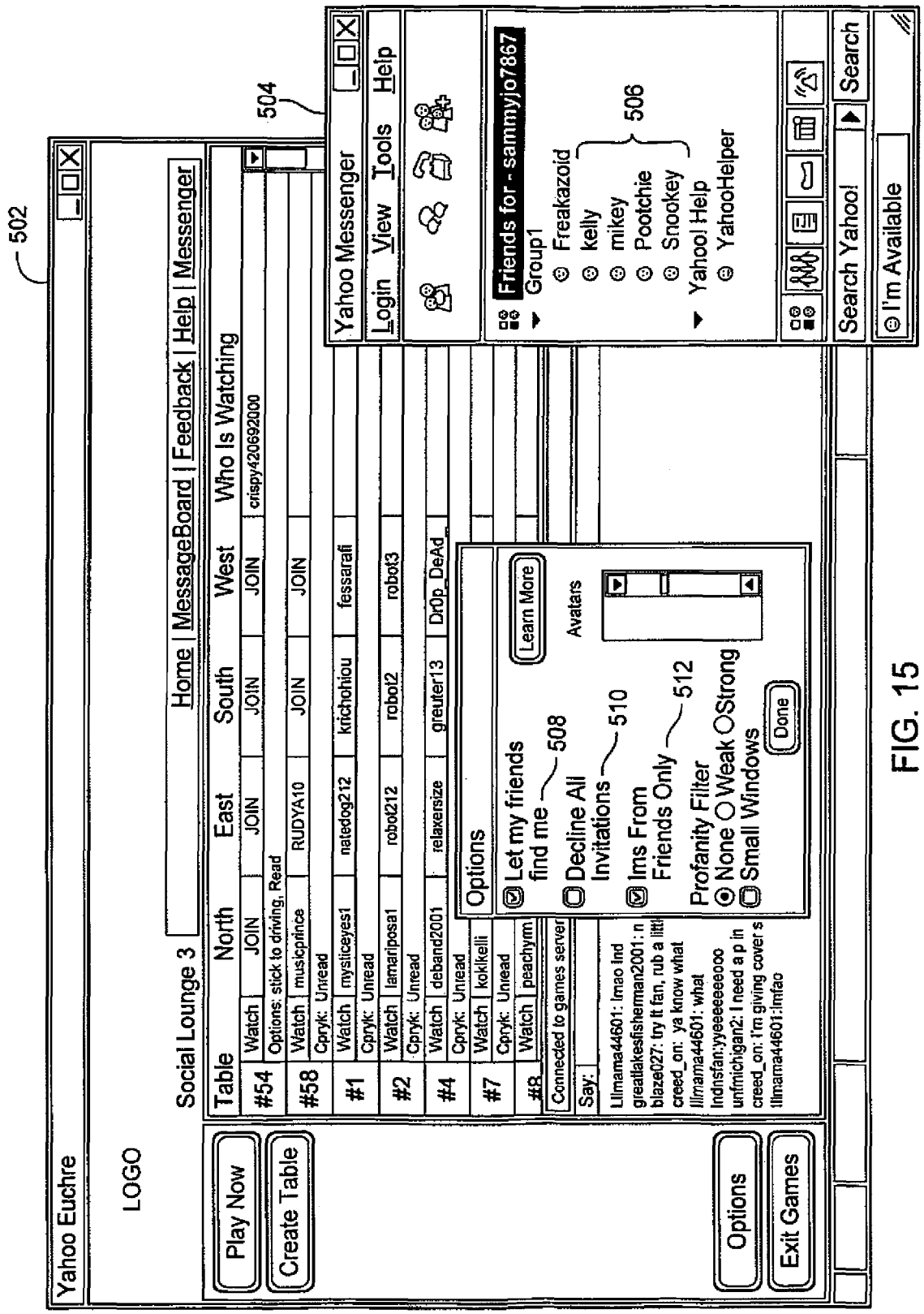
FIG. 15 illustrates a screen shot for an exemplary inviter having a game and messenger client according to one embodiment of the present invention.

FIG. 15 illustrates a screen shot 502 generated using an exemplary inviter game client and messenger client according to one embodiment of the present invention. As shown, "user sammyjo7867" is, or is about to participant in an online game of Euchre. Sammyjo7867 plays Euchre with the use of the game client as described herein. Also shown is a messenger window 504 including Sammyjo7867's friends on a Group1 friends list 506 (i.e., Freakazoid, kelly, mikey, Pootchie, and Snookey). Although each of the friends are shown to be inactive or unavailable, the messenger window will indicate that a friend is online by changing an icon adjacent to the online friend's ID to match the change in status (i.e., change in state). As user sammyjo7867 continues playing a game, sammyjo7867 may optionally elect to allow his/her "friends to find me" 508 by, for example, checking such a selection or may play in stealth or invisible mode. Additionally, user sammyjo7867 may decline all invitations 510 or restrict instant messages (IMs) from only friends 512 on an associated friends list.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. A method comprising:
enabling an inviter game client to check for current running of an inviter messenger client in a same operating system, on initiation of the inviter game client and connection of the inviter game client to a remote game server;
enabling the inviter game client to send, based on an affirmative result of the check, an operating system message to the inviter messenger client that causes at least one game state message to be sent from the inviter messenger client over a network to a messenger server that forwards the at least one game state message to an invitee messenger client, wherein the at least one game state message indicates that the inviter game client is currently active in a particular game, and is sent from the inviter messenger client executing separately from the inviter game client; and
enabling at least one field of data in an invocation message that is used by the invitee messenger client for sending to an invitee game client to initiate joining the particular game, a content of said at least one field of data being provided by the remote game server to the inviter messenger client for inclusion in the at least one game state message, wherein the at least one field of data enables the invitee game client to be invoked that is associated with the invitee messenger client and further enables the invitee game client to initiate joining the currently active particular game to which the inviter game client is joined, and wherein the at least one field of data includes a link to be presented if the invitee game client is not installed.

2. The method of claim 1, wherein a messaging interface causes the data to be provided to the inviter messenger client.

3. The method of claim 1, further comprising sending the at least one game state message from the inviter messenger client to the invitee messenger client.

4. The method of claim 1, wherein the data includes a game server network address that identifies the game server, a game identifier that identifies the active game on the identified game server, a and a port identifier that identifies a port on the identified game server.

5. The method of claim 1, wherein the invitee messenger client is associated with a member of a buddy list of the inviter messenger client, and wherein the inviter messenger client sends the at least one game state message automatically to members of the buddy list.

6. A computer program product encoded on a computer readable nontransitory medium and operable to run on a computer as an inviter client, comprising:
program code operable to cause an inviter game client to check for current running of an inviter messenger client in a same operating system, on initiation of the inviter game client and connection of the inviter game client to a remote game server;
program code operable to cause the inviter game client to send, based on an affirmative result of the check, an operating system message to the inviter messenger client that causes at least one game state message to be sent from the inviter messenger client over a network to a messenger server that forwards the at least one game state message to an invitee messenger client, wherein the at least one game state message indicates that the inviter game client is currently active in a particular game, and is sent from the inviter messenger client executing separately from the inviter game client; and
program code operable to cause at least one field of data in an invocation message that is used by the invitee messenger client for sending to an invitee game client to initiate joining the particular game, a content of said at least one field of data being provided by the remote game server to the inviter messenger client for inclusion in the at least one game state message, wherein the at least one field of data enables the invitee game client to be invoked that is associated with the invitee messenger client and further enables the invitee game client to initiate joining the currently active particular game to which the inviter game client is joined, and wherein the at least one field of data includes a link to be presented if the invitee game client is not installed.

7. The computer program product of claim 6, further comprising:
program code operable to provide a messaging interface, wherein the messaging interface causes the data to be provided to the inviter messenger client.

8. The computer program product of claim 6, further comprising program code operable to send the at least one game state message from the inviter messenger client to the invitee messenger client.

9. The computer program product of claim 6, wherein the data includes a game server network address that identifies the game server, a game identifier that identifies the active game on the identified game server, and a port identifier that identifies a port on the identified game server.

10. The computer program product of claim 6, wherein the invitee messenger client is associated with a member of a buddy list of the inviter messenger client, and wherein the inviter messenger client sends the at least one game state message automatically to members of the buddy list.

11. A system comprising:
an inviter client computer including:
a first memory for storing at least data; and
a first processor that is arranged to enable actions by at least executing modules, comprising:
an inviter game module configured to check for current running of an inviter
messenger module in the same operating system, on initiation of the inviter game module and connection of the inviter game module to a server computer, configured to send, based on an affirmative result of the check, an operating system message to the inviter messenger module that causes at least one game state message to be sent from the inviter messenger module over a network to a
messenger server configured to forward the at least one game state message to an invitee messenger module at an invitee client computer, wherein the at least one game state message indicates that the inviter game module is currently active in a particular game; and
the inviter messenger module for receiving data, wherein the inviter messenger module configured to execute separately from the inviter game module within the first processor; and
the server computer including:
a second memory for storing at least data; and
a second processor that is arranged to enable actions by at least executing modules, comprising:
a first sever module for providing at least one field of data in an invocation message that is used by the invitee messenger client for sending to an invitee game client to initiate joining the particular game, a content of said at least one field of data being provided by the remote game server to the inviter messenger client for inclusion in the at least one game state message, wherein the at least one field of data enables the invitee game client to be invoked that is associated with the invitee messenger client and further enables the invitee game client to initiate joining the currently active particular game to which the inviter game client is joined, and wherein the at least one field of data includes a link to be presented if the invitee game client is not installed.

12. The system of claim 11, wherein the inviter messenger module further provides a messaging interface, wherein the messaging interface causes the data to be received by the inviter messenger module.

13. The system of claim 11, wherein the inviter messenger module further sends the at least one game state message from the inviter messenger module to the invitee messenger module at the invitee client computer.

14. The system of claim 11, wherein the data includes a game server network address that identifies the server computer, a game identifier that identifies the active game on the identified server computer, and a port identifier that identifies a port on the identified server computer.

15. The system of claim 11, wherein the invitee messenger module is associated with a member of a buddy list of the inviter messenger module, and wherein the inviter messenger module sends the at least one game state message automatically to members of the buddy list.

16. An apparatus, comprising:
a memory configured to store at least data including executable instructions; and
a processor configured to execute the instruction for enabling actions, including:
enabling an inviter game client to check for current running of an inviter messenger client in a same operating system, on initiation of the inviter game client and connection of the inviter game client to a remote game server;
enabling the inviter game client to send, based on an affirmative result of the check, an operating system message to the inviter messenger client that causes the inviter messenger client to send at least one game state message over a network to a messenger server that forwards the at least one game state message to an invitee messenger client, wherein the at least one game state message indicates that the inviter game client is currently active in a particular game, and is sent from the inviter messenger client executing separately from the inviter game client; and
providing at least one field of data in an invocation message that is used by the invitee messenger client for sending to an invitee game client to initiate joining the particular game, a content of said at least one field of data being provided by the remote game server to the inviter messenger client for inclusion in the at least one game state message, wherein the at least one field of data enables the invitee game client to be invoked that is associated with the invitee messenger client and further enables the invitee game client to initiate joining the currently active particular game to which the inviter game client is joined, and wherein the at least one field of data includes a link to be presented if the invitee game client is not installed.

17. The apparatus of claim 16, wherein the actions further comprise:
providing a messaging interface, wherein the messaging interface causes the data to be provided to the inviter messenger client.

18. The apparatus of claim 16, further comprising
sending the at least one game state message from the inviter messenger client to the invitee messenger client.

19. The apparatus of claim 16, wherein the data includes a game server network address that identifies the game server, a game identifier that identifies the active game on the identified game server, and a port identifier that identifies a port on the identified game server.

20. The apparatus of claim 16, wherein the invitee messenger client is associated with a member of a buddy list of the inviter messenger client, and wherein the inviter messenger client sends the at least one game state message automatically to members of the buddy list.

* * * * *